(12) United States Patent
Mochikawa et al.

(10) Patent No.: US 6,396,723 B2
(45) Date of Patent: May 28, 2002

(54) RECTIFIER AND TRANSFORMER THEREOF

(75) Inventors: Hiroshi Mochikawa; Junichi Tsuda, both of Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/881,039

(22) Filed: Jun. 15, 2001

(30) Foreign Application Priority Data

Jun. 15, 2000 (JP) .......................................... 2000-179543

(51) Int. Cl.[7] .............................. H02M 7/00; H02M 1/12
(52) U.S. Cl. ............................ 363/125; 363/44; 363/69
(58) Field of Search ................................. 363/39, 40, 44, 363/98, 65, 67, 69, 82, 84, 125, 126

(56) References Cited

U.S. PATENT DOCUMENTS 4,876,634 A    10/1989   Paice ............................. 363/5
5,124,904 A     6/1992   Paice ............................. 363/3
5,910,892 A  *  6/1999   Lyons et al. ................... 363/98

* cited by examiner

*Primary Examiner*—Jessica Han
(74) *Attorney, Agent, or Firm*—Foley & Lardner (57) ABSTRACT

There are provided: a main three-phase full-wave rectifier (8) that converts three-phase AC (R phase, S phase, T phase) into DC; a transformer (9) that outputs AC of a total of six phases corresponding to the points that equally divide by three the arcs drawn in a transformer vector diagram in which an equilateral triangle is formed whereof the R phase, S phase and T phase are vertices, centered on each vertex and linking the remaining two points; and two auxiliary three-phase full-wave rectifiers (12) and (13) in that convert into DC the six-phase AC that is output from the transformer (9), the output lines of the main three-phase full-wave rectifier (8) and two auxiliary three-phase full-wave rectifiers (12) and (13) being connected in parallel. The current flowing in the DC line through the transformer can therefore be reduced to ⅓ of the whole in the case of an 18-pulse rectifier, so enabling the capacity of the transformer to be reduced.

14 Claims, 12 Drawing Sheets

RECTIFIER AND TRANSFORMER THEREOF

BACKGROUND OF THE INVENTION

1. Field of the Invention

The present invention relates to a rectifier and transformer using this rectifier whereby three-phase AC is converted to DC with little harmonics.

2. Description of the Related Art

When converting three-phase AC to DC, the most typical method is to employ a single three-phase full-wave rectifier in which six rectifying elements are connected in a bridge configuration. In such a three-phase full-wave rectifier, DC voltage is output by changing over the rectifying elements so that they successively conduct at intervals of 60°. However, with this method, the rectified DC voltage contains a voltage ripple of large amplitude having a period of six times the power source frequency; this produces harmonics which cause various problems.

Figure 1:
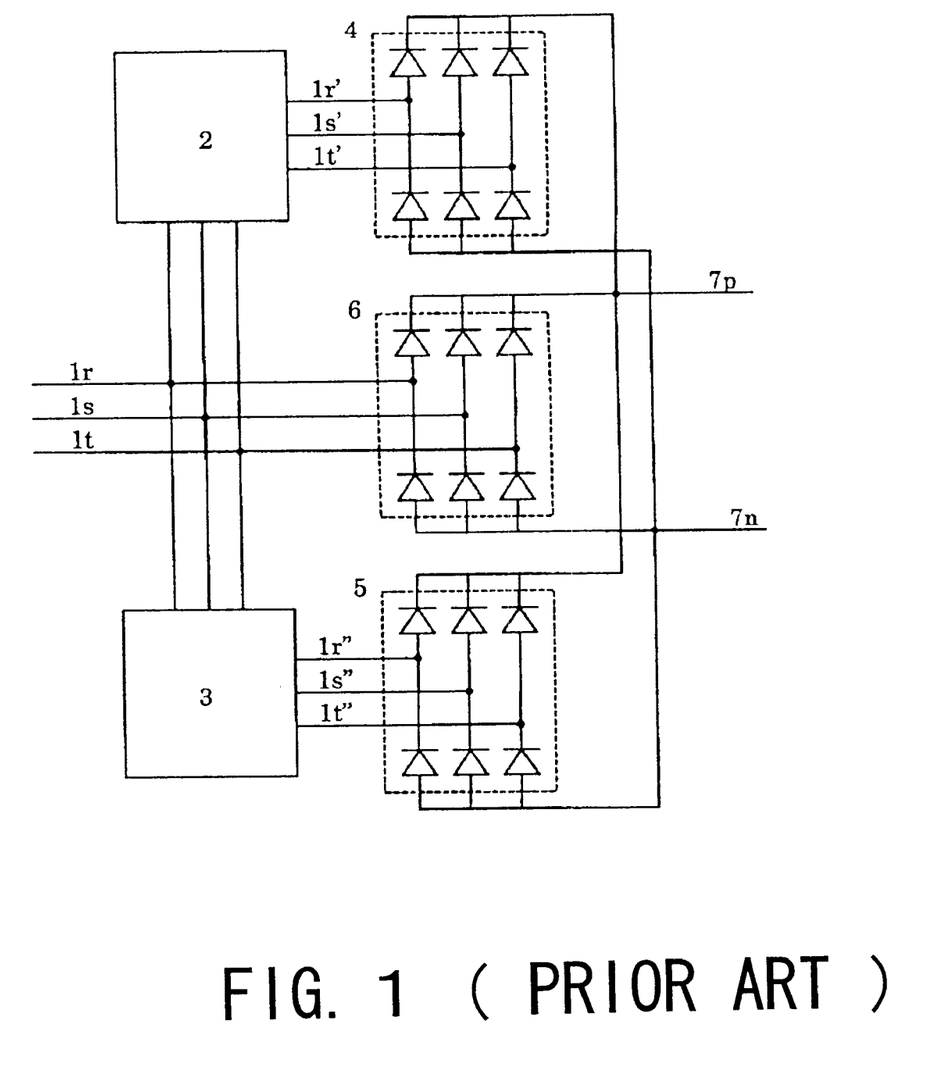
FIG. 1 is a layout diagram of a prior art 12-pulse rectifier.

As a means of dealing with this, 18-pulse AC/DC converters have been proposed such as for example in Laid-open Japanese Patent Publication No. H. 4-229077. As shown in FIG. 1, this is characterized in that, for the power lines 1r, 1s and 1t, two transformers 2 and 3 are employed that output six-phase AC of equal voltage but offset in phase by +40° and −40°, respectively. An arrangement is adopted wherein three-phase full-wave rectifiers 4 and 5 are connected to the two transformers 2 and 3 through lines 1r', 1s' and 1t' and 1r", 1s" and 1t", while three-phase full-wave rectifier 6 is directly connected to power source lines 1r, 1s and 1t. The outputs of the three-phase full-wave rectifiers 4, 5 and 6 are connected in parallel to DC lines 7p and 7n.

Figure 2:
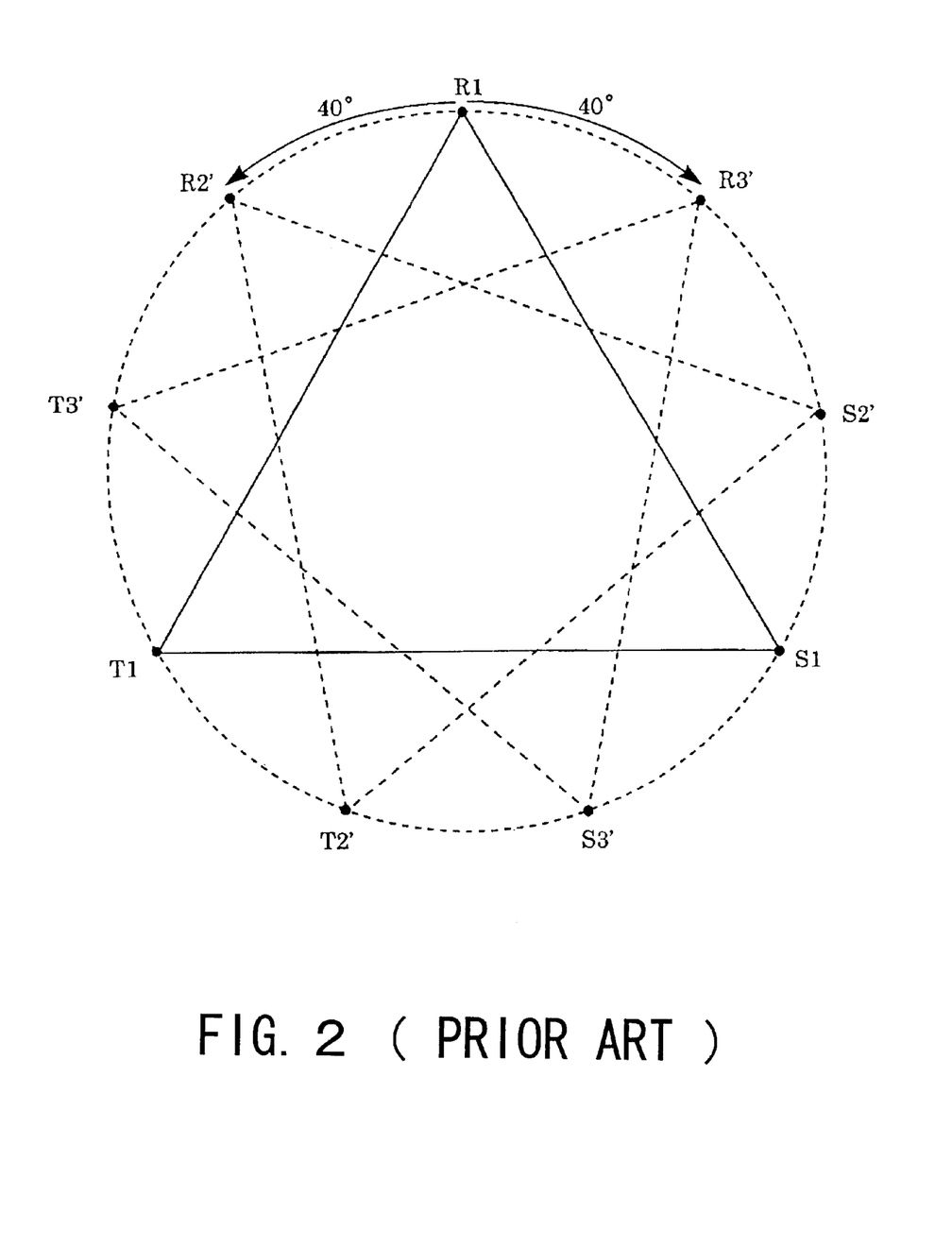
FIG. 2 is a prior art transformer vector diagram.

FIG. 2 is a transformer vector diagram corresponding to FIG. 1. R1, S1 and T1 correspond to the phases of the three-phase AC of the power source, their voltages being input to the three-phase full-wave rectifier 6. In contrast, voltages corresponding to the vertices R2', S2', T2' of the equilateral triangle obtained by rotating by +40° the equilateral triangle formed by the vertices R1, S1 and T1 are output from transformer 2 and input to three-phase full-wave rectifier 4. Likewise, voltages corresponding to the vertices R3', S3' and T3' of the equilateral triangle obtained by rotating by −40° the equilateral triangle formed by the vertices R1, S1 and T1 are output from transformer 3 and input to three-phase full-wave rectifier 5.

Since the three-phase full-wave rectifier 4 or three-phase full-wave rectifier 5 conduct so as to fill in the valleys of the DC voltage ripple that is output through three-phase full-wave rectifier 6 in the 18-pulse transformer constructed in this way, the voltage ripple becomes small, and harmonics are reduced.

However, with this system, it is necessary that voltage of magnitude equal to the three-phase AC voltage of the power source should be output from the transformer, and the current flowing must also be uniform in order for the three-phase full-wave rectifiers to conduct equally. Consequently, the current that is rectified through the transformers is large at ⅔ of the total, and transformers are required which can withstand this current capacity. Effective miniaturization of the 18-pulse rectifier is therefore impeded by the fact that practically all of its capacity is accounted for by the transformers.

SUMMARY OF THE INVENTION

Accordingly, one object of present invention is to provide a novel 12- or 18-pulse rectifier and transformer using such a rectifier whereby performance equivalent to the above can be achieved using a transformer of even smaller size.

In order to achieve the above object, a rectifier according to the present invention comprises: a main three-phase full-wave rectifier that converts three-phase AC (R phase, S phase, T phase) into DC; a transformer that outputs AC of a total of 3(n−1) phases corresponding to the points that equally divide by n (n=2, 3) the arcs drawn in a transformer vector diagram in which an equilateral triangle is formed whereof the R phase, S phase and T phase are vertices, centered on each vertex and linking the remaining two points; and (n−1) auxiliary three-phase full-wave rectifier(s) that convert into DC the 3(n−1) phase AC that is output from the transformer, the output lines of the main three-phase full-wave rectifier and the (n−1) auxiliary three-phase full-wave rectifier(s) being connected in parallel.

With a rectifier constructed in this way, the output voltage from the transformer becomes lower than the power source voltage. Furthermore, the current flowing through the transformer in the DC line can be reduced to ¼ of the whole in the case of a 12-pulse rectifier and to ⅓ of the whole in the case of an 18-pulse rectifier, so transformer capacity can be reduced.

In a rectifier according to the present invention the transformer satisfies a transformer vector diagram obtained by adding to the equilateral triangle 3(n−1) straight lines extending parallel with the one side of the equilateral triangle which is furthest, on the sides of the equilateral triangle that are closest to the respective points obtained by the n equal divisions of the arc, in the transformer vector diagram.

With a rectifier constructed in this way, a transformer can be realized with a straightforward winding construction.

In a rectifier according to the present invention, in the transformer vector diagram, the transformer satisfies a transformer vector diagram expressed by the periphery of the 3(n+2)-gon formed by superimposing the 3(n−1)-gon formed with the n points of equal division of the arc as vertices on the equilateral triangle.

With a rectifier constructed in this way, the total number of turns of the winding becomes fewer than in the case of the transformer described above and the capacity becomes smaller, so further miniaturization of the transformer can be achieved.

In a rectifier according to the present invention, in the transformer vector diagram, the transformer satisfies a transformer vector diagram expressed by the hexagon formed by straight lines parallel with the side opposite the equilateral triangle and passing through the vertices of the equilateral triangle and straight lines parallel with the sides adjacent the equilateral triangle passing through the n points of equal division of the arc.

With a rectifier constructed in this way, a transformer of small capacity can be achieved with a simpler winding construction.

In a rectifier according to the present invention, reactors corresponding to the leakage inductance of the transformer are mounted on each phase of the power lines (R phase, S phase and T phase) between the branch point to the transformer and the main three-phase full-wave rectifier.

With a rectifier constructed in this way, the drop in output voltage into the auxiliary three-phase full-wave rectifiers resulting from the leakage inductance of the transformer is balanced by a lowering of input voltage to the main three-phase full-wave rectifier produced by the provision of the reactors, so the conduction angle of the main three-phase full-wave rectifier and auxiliary three-phase full-wave rectifiers can easily be adjusted.

In a rectifier according to the present invention, harmonic attenuators such as DC reactors are provided on the DC lines where the outputs of the main three-phase full-wave rectifier and the (n−1) auxiliary three-phase full-wave rectifiers are connected in parallel.

With a rectifier constructed in this way, the slight remaining voltage ripple in the DC that is output through the main three-phase full-wave rectifier and auxiliary three-phase full-wave rectifiers can be further reduced.

A transformer according to the present invention inputs three-phase AC (R phase, S phase and T phase) and, in a transformer vector diagram in which an equilateral triangle is formed whose vertices are the R phase, S phase and T phase, outputs AC of a total of 3(n−1) phases corresponding to the points of equal division by n (n=2, 3) of the arcs centered on each vertex and drawn connecting the remaining two points.

With a transformer constructed in this way, the output voltage is lowered compared with a transformer in which the position vectors of the output voltage are distributed on a circle passing through the vertices R1, S1, T1 of an equilateral triangle, as shown in the prior art example.

A transformer according to the present invention satisfies a transformer vector diagram obtained by adding to the equilateral triangle 3(n−1) straight lines extending parallel with the one side of the equilateral triangle which is furthest, on the sides of the equilateral triangle that are closest to the respective points obtained by the n equal divisions of the arc, in the transformer vector diagram.

With a transformer constructed in this way, the transformer can be realized by a straightforward winding construction.

A transformer according to the present invention, in the transformer vector diagram, satisfies a transformer vector diagram expressed by the periphery of the 3(n+2)-gon formed by superimposing the 3(n−1)-gon formed with the n points of equal division of the arc as vertices on the equilateral triangle.

With a transformer constructed in this way, the total number of turns of the windings is smaller, and the capacity is also smaller, so even further miniaturization of the transformer can be achieved.

A transformer according to the present invention, in the transformer vector diagram, satisfies a transformer vector diagram expressed by the hexagon formed by straight lines parallel with the side opposite the equilateral triangle and passing through the vertices of the equilateral triangle and straight lines parallel with the sides adjacent the equilateral triangle passing through the n points of equal division of the arc.

With a transformer constructed in this way, a transformer of small capacity can be realized with a simpler winding construction.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views, and more particularly to FIG. 3, FIG. 4 and FIG. 5 thereof, one embodiment of the present invention will be described.

Figure 3:
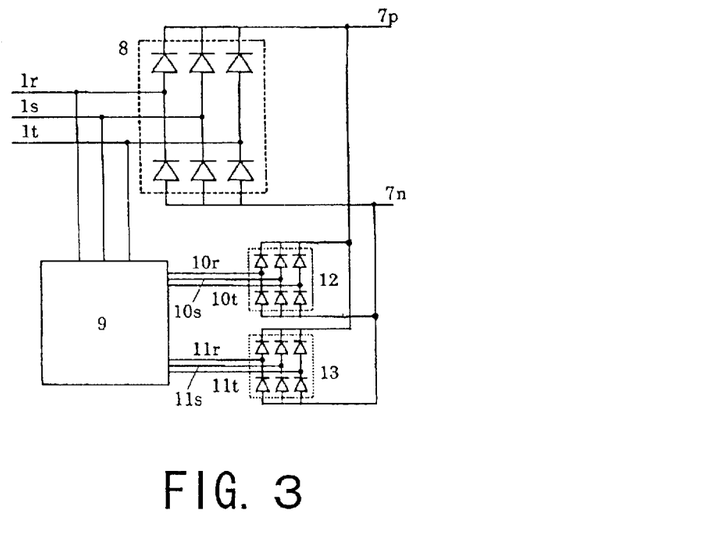
FIG. 3 is a layout diagram of an 18-pulse rectifier according to a first embodiment of the present invention.

FIG. 3 is a layout diagram illustrating the layout of an 18-pulse rectifier, wherein a main three-phase full-wave rectifier 8 is connected by power lines 1r, 1s and 1t to a three-phase AC power source (not shown). Furthermore, transformer 9 is connected to power lines 1r, 1s and 1t and the total of six phases that are output on the secondary side of this transformer 9 are respectively input to two auxiliary three-phase full-wave rectifiers 12 and 13 through three power lines 10r, 10s and 10t, and 11r, 11s and 11t. The outputs of the main three-phase full-wave rectifier 8 and the two auxiliary three-phase full-wave rectifiers 12 and 13 are connected in parallel to DC lines 7p and 7n.

Figure 4:
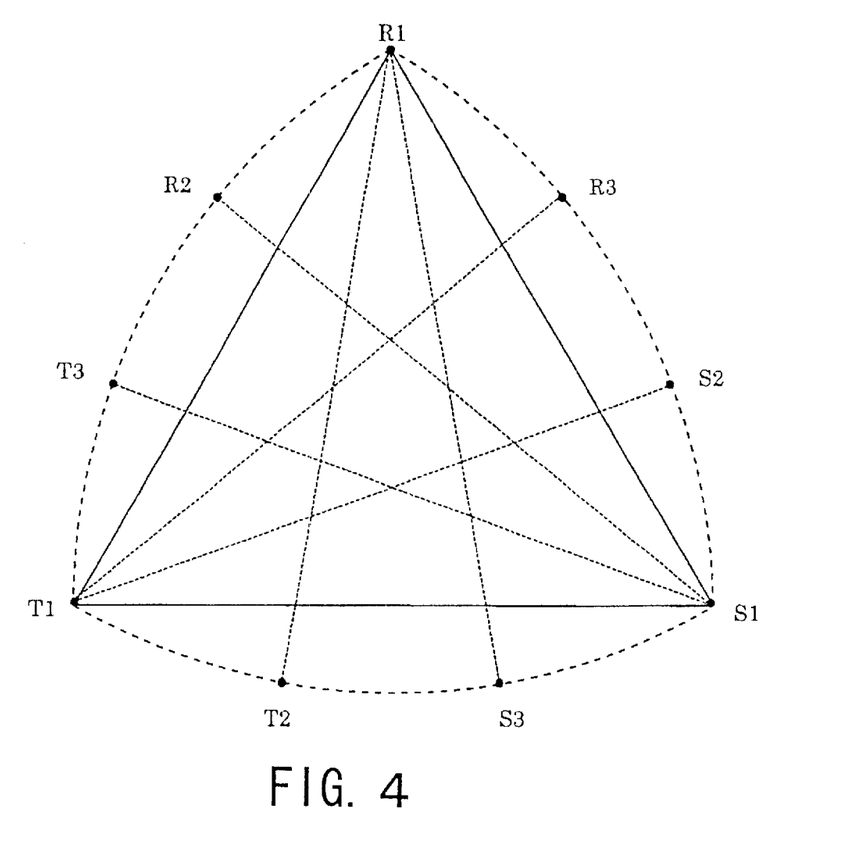
FIG. 4 is a transformer vector diagram of the first embodiment of the present invention.

FIG. 4 is a transformer vector diagram representing the six phase voltage vectors that are output from transformer 9. The three arcs X1Y1 (X, Y=R, S, T (X≈Y)) in the Figure have at their centers the vertices of the equilateral triangles formed by the three-phase AC: R1, S1 and T1 of the power source.

Also, the points X3 and Y2 on the arcs represent positions that trisect arcs X1Y1 at intervals of 20°; the voltages represented by these six position vectors are output from transformer 9 to the two auxiliary three-phase full-wave rectifiers 11 and 12.

If such a transformer is employed, the output voltages are lower than for a transformer such as would give output voltage position vectors on the circle passing through vertices R1, S1 and T1 of the equilateral triangle as shown in the prior art example.

Figure 5:
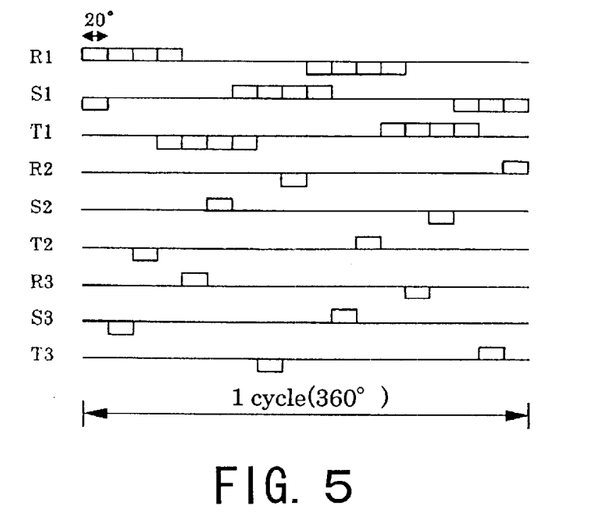
FIG. 5 is a diagram illustrating the conduction condition of a main three-phase full-wave rectifier and two auxiliary three-phase full-wave rectifiers of an 18-pulse rectifier according to a first embodiment of the present invention.

Furthermore, FIG. 5 shows the conduction condition of the main three-phase full-wave rectifier 8 and two auxiliary three-phase full-wave rectifiers 12 and 13 for the respective phases of the first embodiment.

Whereas the conductive condition of the phases R1, S1 and T1 of the main three-phase full-wave rectifier 8, including the plus side and the minus side occurs for 160° out of 360° of a single cycle, in the case of the six phases of the auxiliary three-phase full-wave rectifiers 12 and 13, including the plus side and the minus side, the conductive condition occurs for 40°, which is only ¼ of that of the main three-phase full-wave rectifier 8.

Consequently, of the current flowing from the AC power source lines 1r, 1s and 1t to the DC lines 7p and 7n, the current flowing through transformer 9 and the two auxiliary three-phase full-wave rectifiers 12 and 13 is ⅓ of the total. This means that, compared with the situation in the prior art example in which the current flows equally in the three-phase full-wave rectifiers and ⅔ of the total current flows through the transformers, the current is halved, so the transformer capacity can be halved.

Next, a second embodiment of the present invention will be described.

Figure 6:
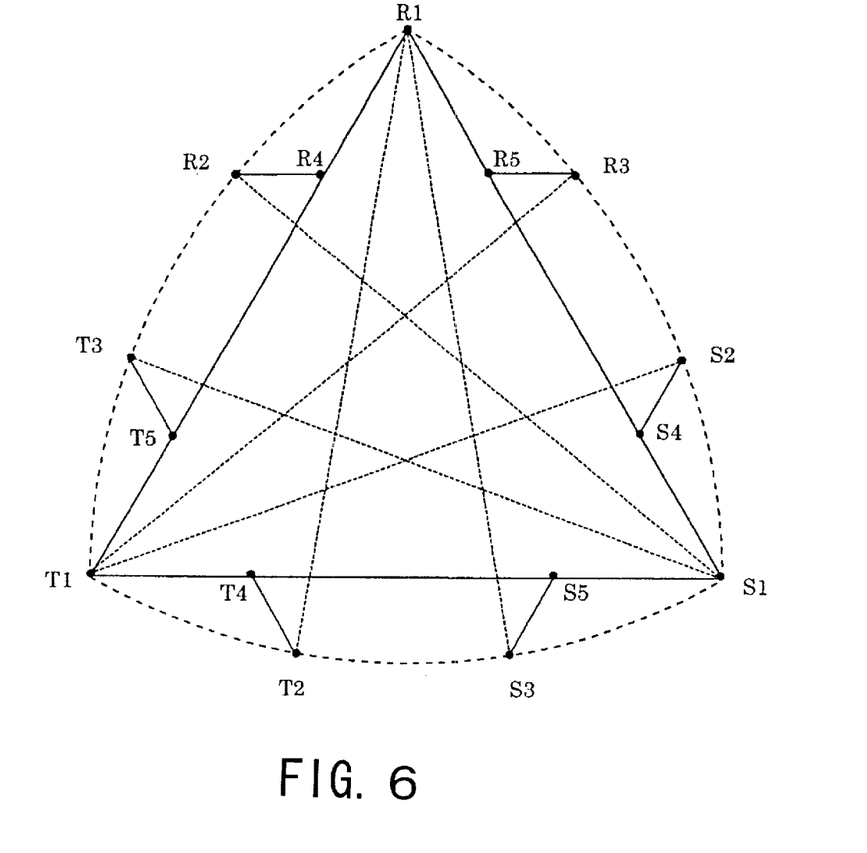
FIG. 6 is a transformer vector diagram of a second embodiment of the present invention.

FIG. 6 shows a second embodiment of the present invention and is a transformer vector diagram illustrating a specific winding construction of the transformer illustrated in the first embodiment. Points X4 and X5 in the Figure are positioned on the sides of the equilateral triangle whose vertices are R1, S1 and T1, and straight lines X2X4 and X3X5 are positioned so as to be parallel with sides Y1Z1 (Z=R S, T (Z≈X, Y)).

Figure 7:
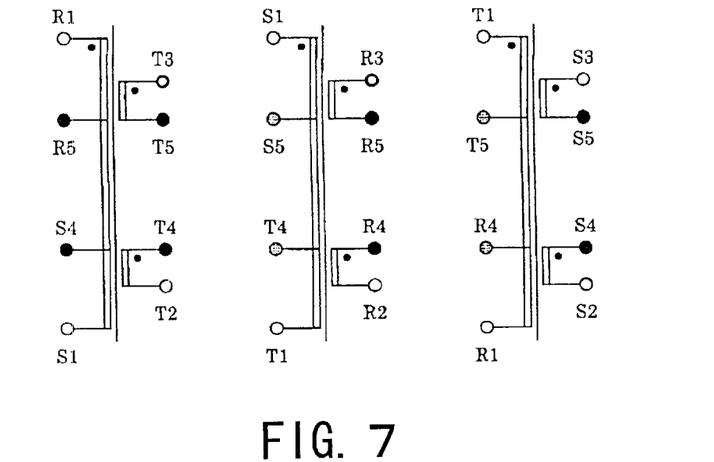
FIG. 7 is a diagram of the winding structure of a transformer according to a second embodiment of the present invention.

FIG. 7 represents diagrammatically the actual winding construction of the transformer represented in FIG. 6. In this construction, the primary windings of transformer 9 connected to power lines 1r, 1s, and 1t constitute a delta connection and two sets of secondary windings are provided corresponding to each primary winding. The total of six connection points X4, X5 provided between primary windings X1Y1 corresponding to the transformer vector diagram of FIG. 6 are respectively connected to the corresponding secondary windings. X2 and X3 of the secondary windings are output terminals and are connected to the two auxiliary three-phase full-wave rectifiers 12 and 13.

The voltage ratio between the terminals i.e. the turns ratio of the windings is designed to be proportional to the length of the leads in FIG. 6. If it is difficult to match the turns ratio precisely, a suitably approximated ratio is selected. By adopting such a winding construction, the transformer winding construction is simplified, so the proposed 18-pulse rectifier can be realized at low cost.

Next, a third embodiment of the present invention will be described.

Figure 8:
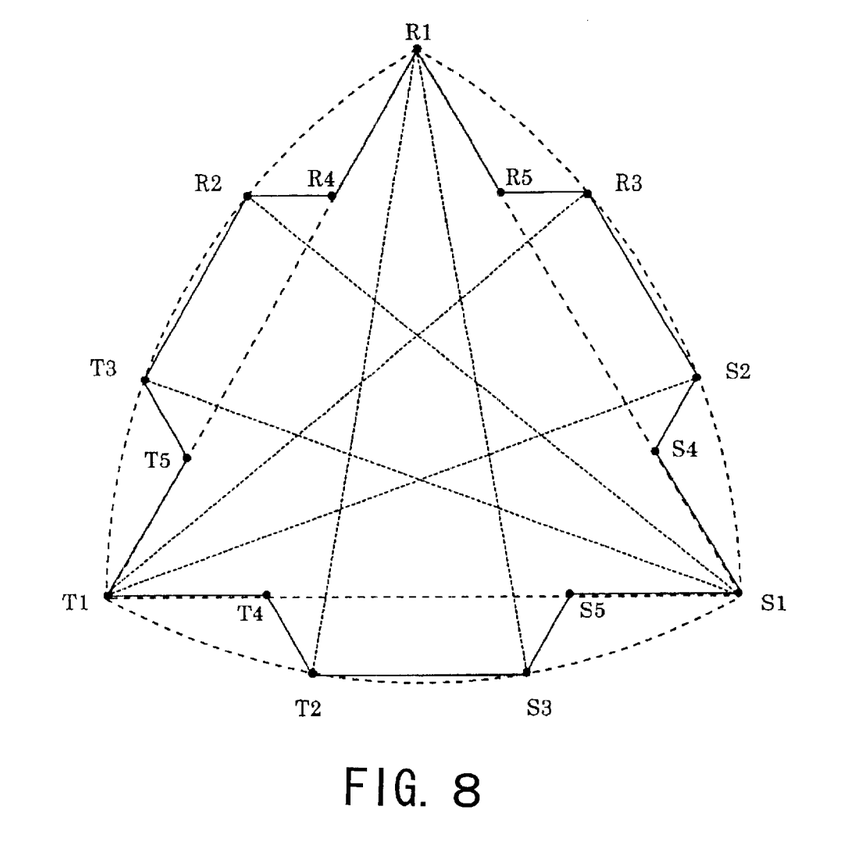
FIG. 8 is a transformer vector diagram of a third embodiment of the present invention.

FIG. 8 illustrates a third embodiment of the present invention and is a transformer vector diagram illustrating the specific transformer winding construction illustrated in the first embodiment. Comparing this with the transformer vector diagram of FIG. 6 that illustrates the second embodiment, this is represented by a vector diagram in which straight line X5Y4 is deleted and instead X3 and Y2 are connected by a straight line.

Figure 9:
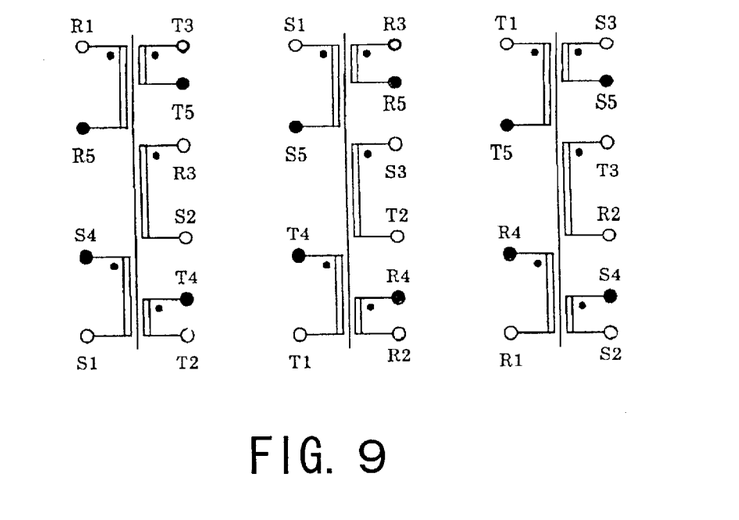
FIG. 9 is a diagram of the winding structure of a transformer according to a third embodiment of the present invention.

FIG. 9 shows the actual winding construction of the transformer illustrated in FIG. 8 represented diagrammatically. In this embodiment, all the primary windings and secondary windings are connected to a single one and X2 and X3, which are intermediate terminals, constitute the output terminals to the two auxiliary three-phase full-wave rectifiers 12 and 13. In this case, just as in the second embodiment, the voltage ratios between the terminals i.e. the turns ratio of the windings are designed so as to be proportional to the length of the respective leads in FIG. 8.

In FIG. 8, the length of straight line X3Y2 is shorter than that of straight line X5Y4. This means that, compared with the second embodiment, the apportionment ratio produced by the turns ratio is smaller, so the voltage share of the winding is decreased, decreasing the transformer capacity and, in addition, decreasing the number of turns, thus making it possible to realize an even smaller transformer.

Next, a fourth embodiment of the present invention will be described.

Figure 10:
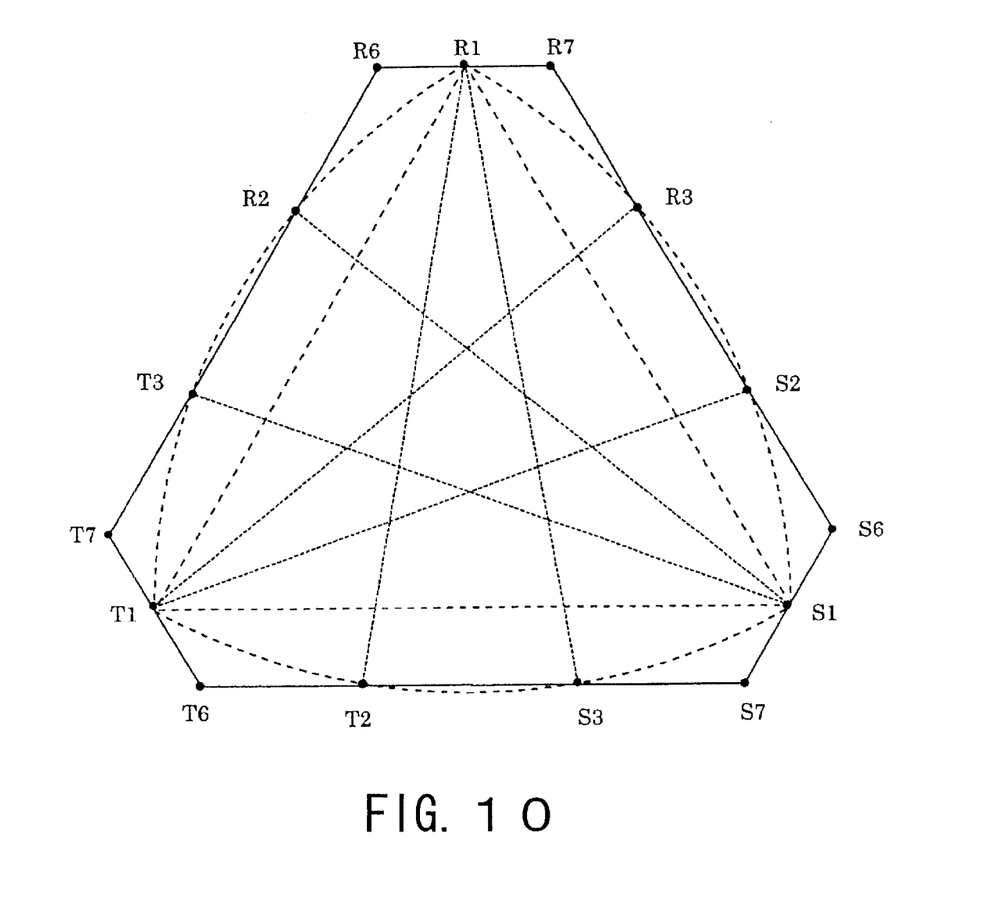
FIG. 10 is a transformer vector diagram of a fourth embodiment of the present invention.

FIG. 10 illustrates a fourth embodiment of the present invention and is a transformer vector diagram illustrating a specific winding construction of the transformer illustrated in the first embodiment. It is represented by a hexagon, in which the sides X6X7 passing through X1 are parallel with the sides Y1Z1 of the equilateral triangle and sides X7Y6 pass through points X3, Y2 which equally divide the arcs.

Figure 11:
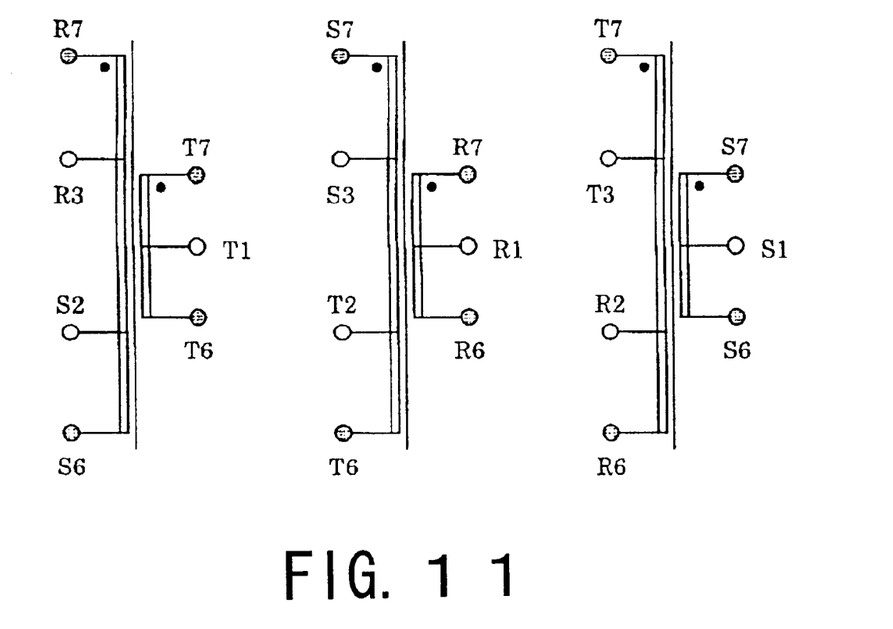
FIG. 11 is a diagram of the winding structure of a transformer according to a fourth embodiment of the present invention.

FIG. 11 represents diagrammatically the actual winding construction of the transformer illustrated in FIG. 10. In this embodiment, transformer 9 is of a single winding construction, and AC power lines 1r, 1s and 1t are connected at an intermediate point of the secondary winding.

The output terminals to the two auxiliary three-phase full-wave rectifiers 12, 13 are X2 and X3, which are midway along the primary winding. In this case, just as in the case of the second embodiment and third embodiment, the turns ratio of the respective windings is determined so as to practically coincide with the length ratio of the corresponding leads in FIG. 10.

With this winding construction, compared with the third embodiment, the voltage apportionment ratio of the windings is the same, but the number of terminals is reduced, so a transformer construction which is restricted to small capacity can be realized with an even simpler winding construction, thereby making it possible to achieve further cost reduction.

A 12-pulse rectifier constituting a fifth embodiment of the present invention is described with reference to FIG. 12, FIG. 13 and FIG. 14.

Figure 12:
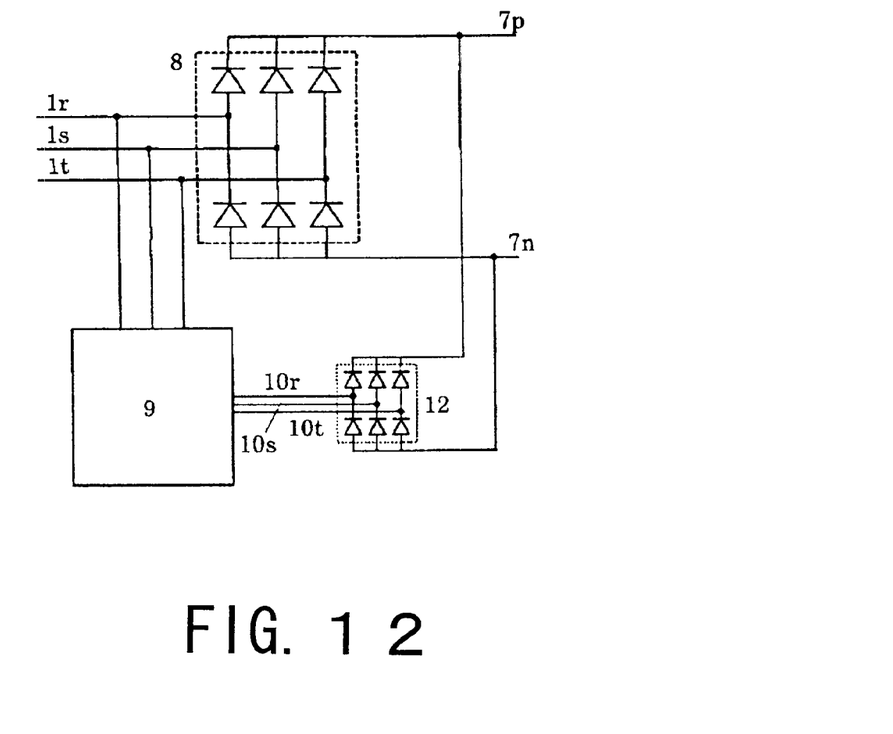
FIG. 12 is a layout diagram of a 12-pulse rectifier according to a fifth embodiment of the present invention.

FIG. 12 is a layout diagram illustrating the construction of a 12-pulse rectifier, in which main three-phase full-wave rectifier 8 is connected to a three-phase AC power source (not shown) by power lines 1r, 1s and 1t. In addition, transformer 9 is connected to power lines 1r, 1s and 1t and the three-phase that 1s output on the secondary side of this transformer 9 is input to auxiliary three-phase full-wave rectifier 12 through the three power lines 10r, 10s and 10t. The outputs of the main three-phase full-wave rectifier 8 and auxiliary three-phase full-wave rectifier 12 are connected in parallel to DC lines 7p and 7n.

Figure 13:
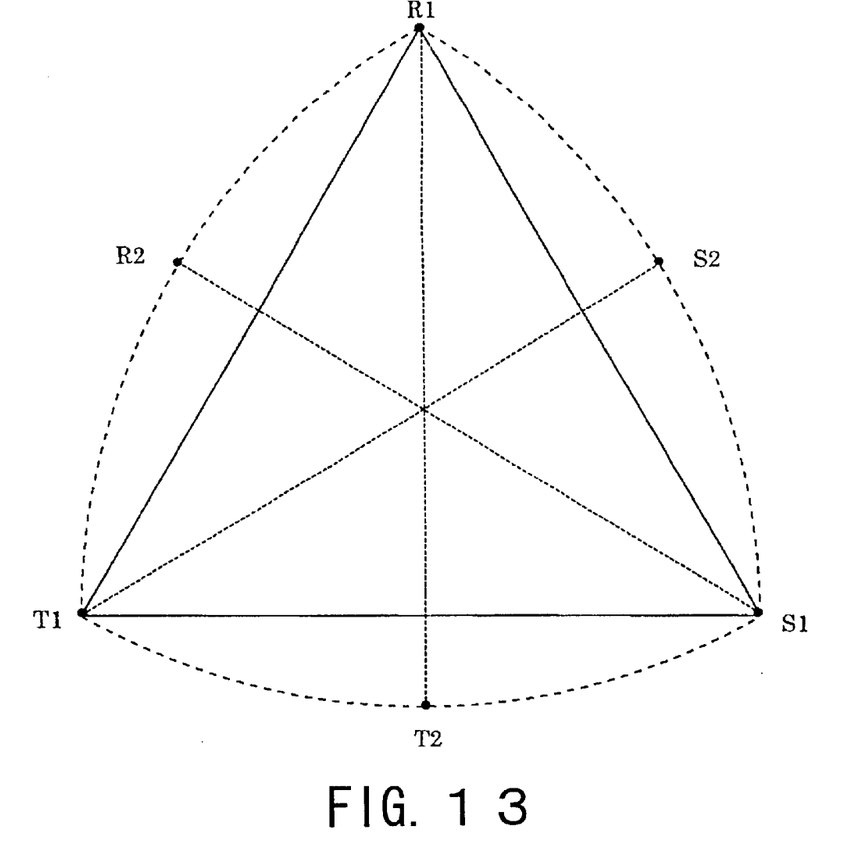
FIG. 13 is a transformer vector diagram of a fifth embodiment of the present invention.

FIG. 13 is a transformer vector diagram representing the three-phase voltage vectors that are output from transformer 9. In the Figure, the three arcs X1Y1 (X, Y=R, S, T (S≈Y)) have at their centers the respective vertices of the equilateral triangles formed by the three-phase AC R1, S1 and T1 of the power source.

Also, the points Y2 on the arcs represent the positions in which arcs X1Y1 are bisected at an interval of 30° in each case; the voltages represented by these three position vectors are output from transformer 9 to auxiliary three-phase full-wave rectifier 12.

When such a transformer is employed, the output voltage is lowered compared with a transformer in which the position vectors of the output voltage are distributed on a circle passing through the vertices R1, S1 and T1 of an equilateral triangle, as shown in the prior art example.

Figure 14:
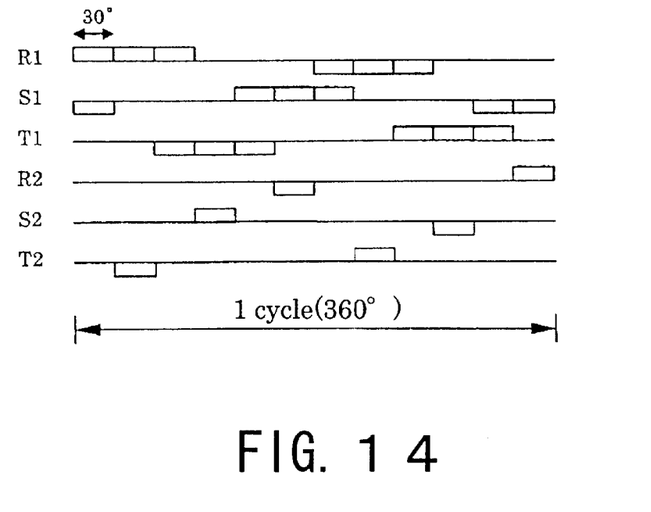
FIG. 14 is a diagram illustrating the conduction condition of a main three-phase full-wave rectifier and auxiliary three-phase full-wave rectifiers of a 12-pulse rectifier according to a fifth embodiment of the present invention.

Further, FIG. 14 shows the conduction conditions of the main three-phase full-wave rectifier 8 and auxiliary three-phase full-wave rectifier 12 for each phase of the fifth embodiment. Whereas the conductive condition of the phases R1, S1 and T1 of the main three-phase full-wave rectifier 8, including the plus side and the minus side occurs for 180° out of 360° of a single cycle, in the case of the three phases of the auxiliary three-phase full-wave rectifier 12, including the plus side and the minus side, the conductive condition occurs for 60°, which is only ⅓ of that of the main three-phase full-wave rectifier 8.

Consequently, of the current flowing from the AC power source lines 1r, 1s and 1t to the DC lines 7p and 7n, the current flowing through transformer 9 and the auxiliary three-phase full-wave rectifier 12 is ¼ of the total so the transformer capacity can be greatly reduced.

Next, a sixth embodiment of the present invention will be described.

Figure 15:
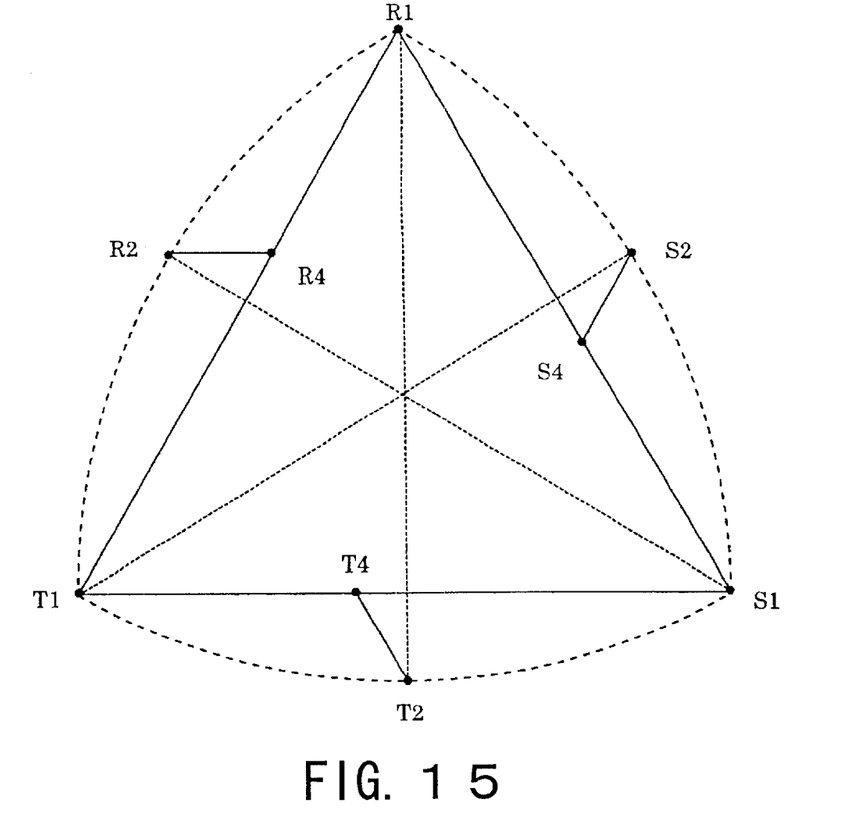
FIG. 15 is a transformer vector diagram of a sixth embodiment of the present invention.

FIG. 15 illustrates a sixth embodiment of the present invention and is a transformer vector diagram illustrating the specific winding construction of the transformer illustrated in the fifth embodiment. Points X4 in the Figure is positioned on the sides of the equilateral triangle whose vertices are R1, S1 and T1, and straight lines X2X4 are positioned so as to be parallel with sides Y1Z1 (Z=R, S, T (Z≈X, Y)).

Figure 16:
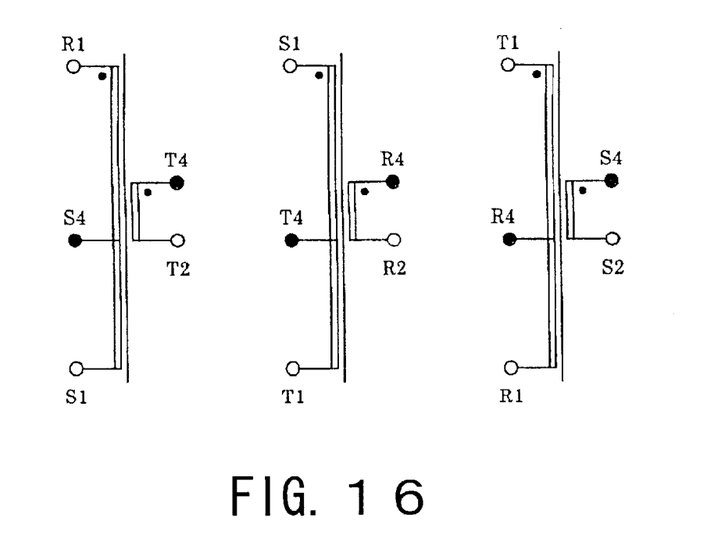
FIG. 16 is a diagram of the winding structure of a transformer according to a sixth embodiment of the present invention.

FIG. 16 represents diagrammatically the actual winding construction of the transformer represented in FIG. 15. In this construction, the primary windings of transformer 9 connected to power lines 1r, 1s, and 1t constitute a delta connection and one set of secondary windings is provided corresponding to each primary winding. The total of three connection point X4 provided between primary windings X1Y1 corresponding to the transformer vector diagram of FIG. 6 are respectively connected to the corresponding secondary windings. X2 of the secondary windings are output terminals and are connected to the auxiliary three-phase full-wave rectifier 12.

The voltage ratio between the terminals i.e. the turns ratio of the windings is designed to be proportional to the length of the leads in FIG. 15. If it is difficult to match the turns ratio precisely, a suitably approximated ratio is selected. By adopting such a winding construction, the proposed 12-pulse rectifier can be realized at low cost, using a transformer of simple construction.

Next, a seventh embodiment of the present invention will be described.

Figure 17:
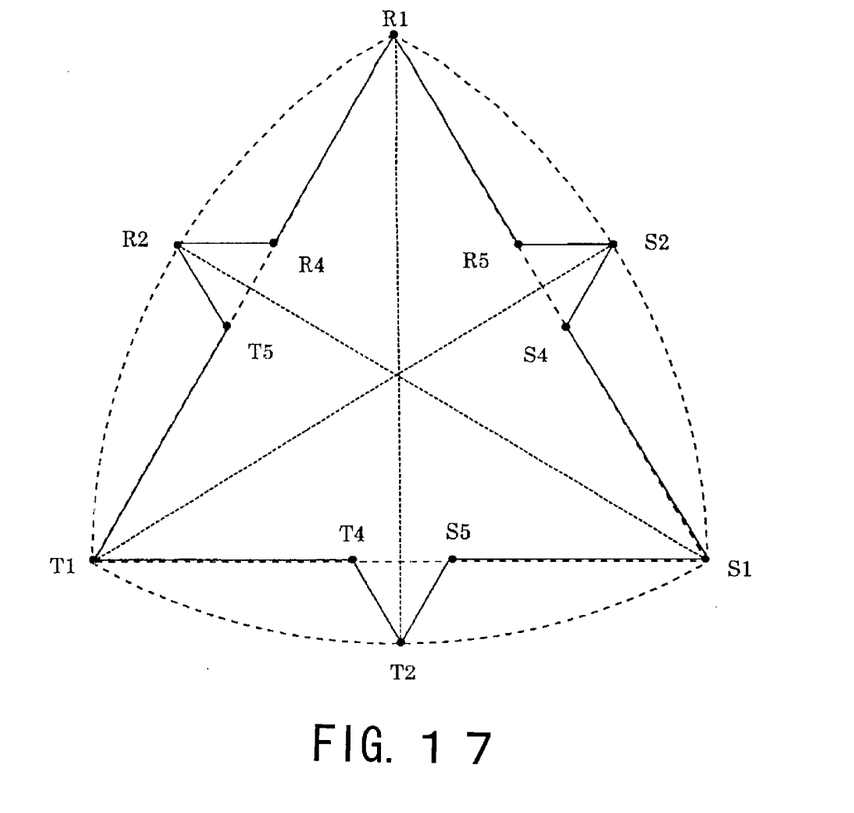
FIG. 17 is a transformer vector diagram of a seventh embodiment of the present invention.

FIG. 17 shows a seventh embodiment of the present invention and is a transformer vector diagram illustrating a specific winding construction of the transformer illustrated in the fifth embodiment. Points X4 and X5 in the Figure are positioned on the sides of the equilateral triangle whose vertices are R1, S1 and T1, and straight lines X2X4 are positioned so as to be parallel with sides Y1Z1 (Z=R, S, T (Z≈X, Y)), while straight lines X2Y5 are positioned so as to be parallel with sides X1Z1 (Z=R, S, T (Z≈X, Y))

Figure 18:
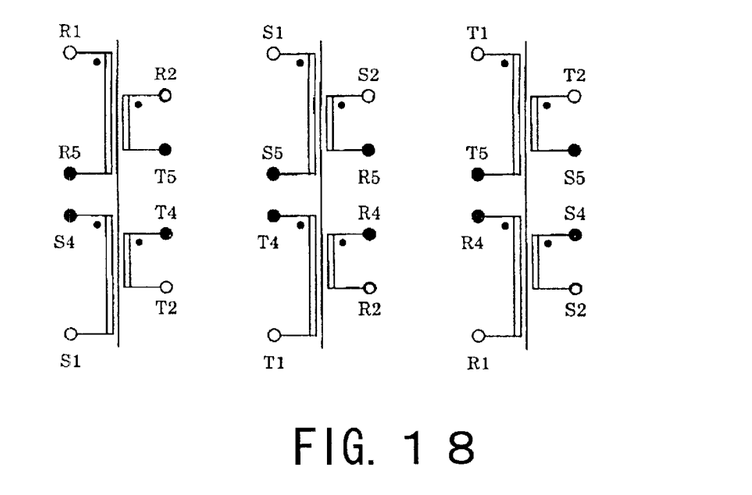
FIG. 18 is a diagram of the winding structure of a transformer according to a seventh embodiment of the present invention.

FIG. 18 represents diagrammatically the actual winding construction of the transformer represented in FIG. 17. In this embodiment, all the primary windings and secondary windings are connected to a single one and X2, which are intermediate terminals, constitute the output terminals to the auxiliary three-phase full-wave rectifier 12. In this case, just as in the sixth embodiment, the voltage ratios between the terminals i.e. the turns ratio of the windings are designed so as to be proportional to the length of the respective leads in FIG. 17.

Next, an eighth embodiment of the present invention will be described.

Figure 19:
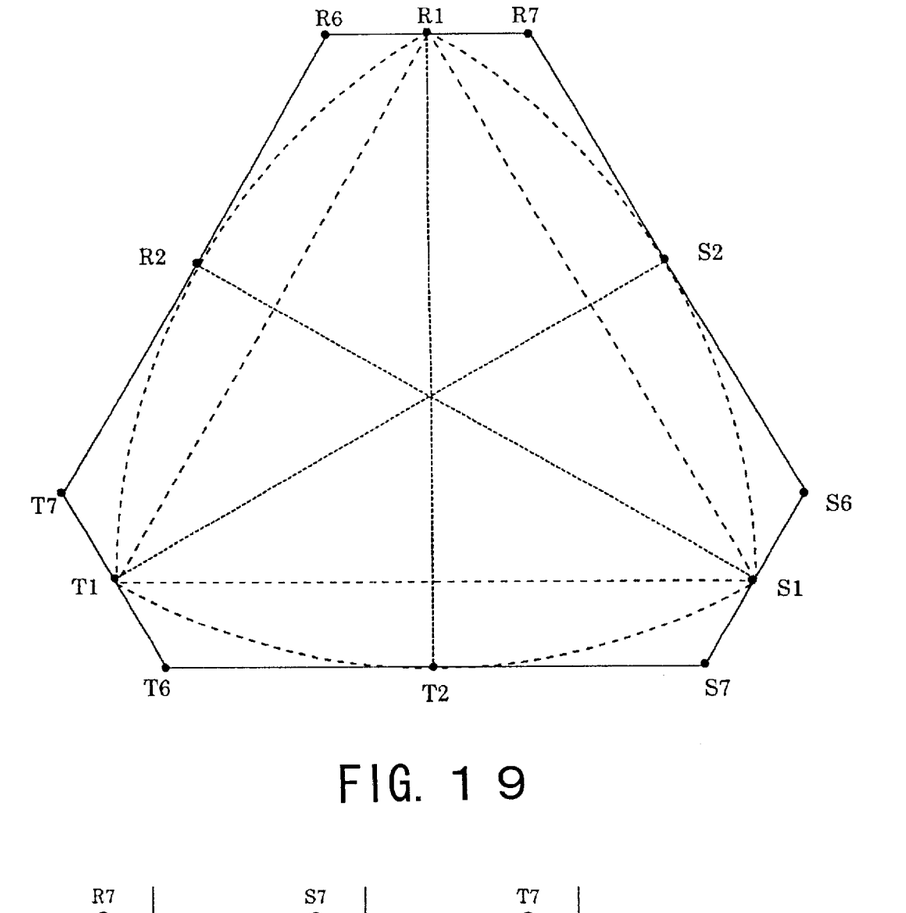
FIG. 19 is a transformer vector diagram of an eighth embodiment of the present invention.

FIG. 19 illustrates an eighth embodiment of the present invention and is a transformer vector diagram illustrating a specific winding construction of the transformer illustrated in the fifth embodiment. It is represented by a hexagon, in which the sides X6X7 passing through X1 are parallel with the sides Y1Z1 of the equilateral triangle and sides X7Y6 pass through points X2 which equally divide the arcs.

Figure 20:
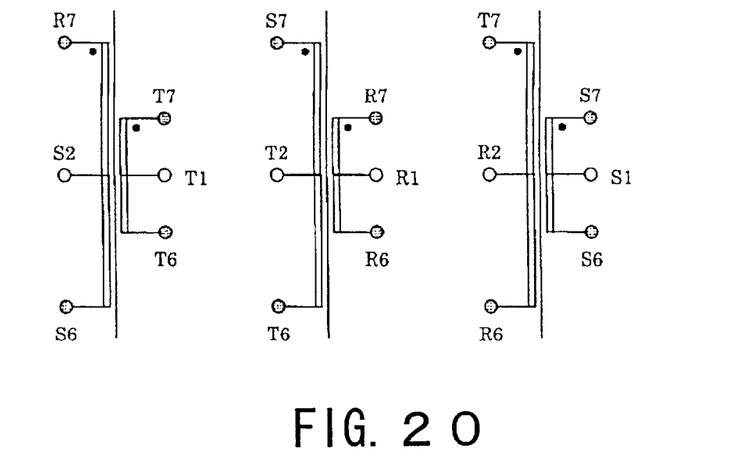
FIG. 20 is a diagram of the winding structure of a transformer according to an eighth embodiment of the present invention.

FIG. 20 represents diagrammatically the actual winding construction of the transformer illustrated in FIG. 19. In this embodiment, transformer 9 is of a single winding construction, and AC power lines 1r, 1s and 1t are connected at an intermediate point of the secondary winding.

The output terminals to the auxiliary three-phase full-wave rectifier 12 are X2, which are midway along the primary winding. In this case, just as in the case of the sixth embodiment and seventh embodiment, the turns ratio of the respective windings is determined so as to practically coincide with the length ratio of the corresponding leads in FIG. 19.

With this winding construction, compared with the seventh embodiment, the voltage apportionment ratio of the windings is the same, but the number of terminals is reduced, so the transformer can be further simplified.

Figure 21:
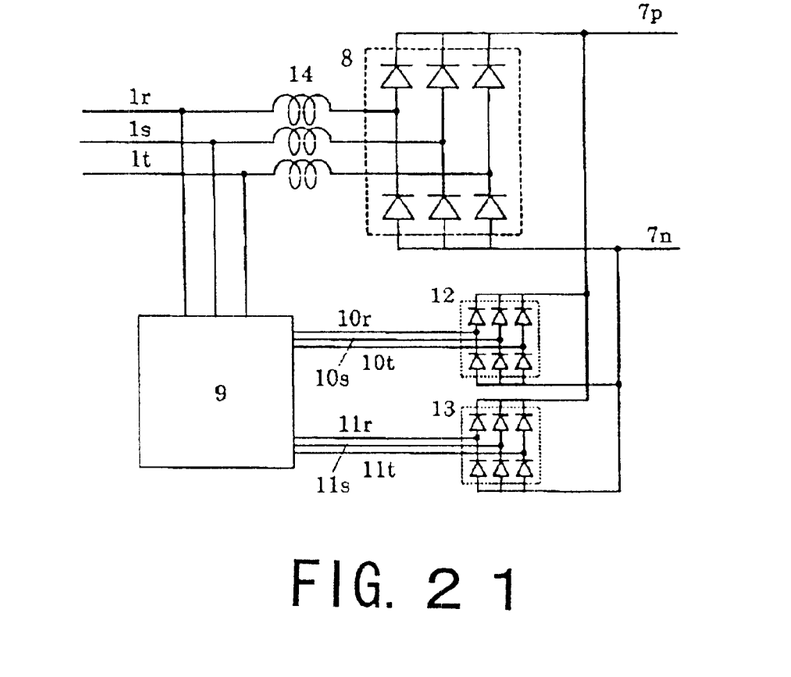
FIG. 21 is a layout diagram of an 18-pulse rectifier according to a ninth embodiment of the present invention.

FIG. 21 is a layout diagram illustrating a ninth embodiment of the present invention. In contrast to FIG. 3, which illustrates the first embodiment, reactors 14 are respectively mounted on the power lines 1r, 1s and 1t between the branch points to transformer 9 and the main three-phase full-wave rectifier 8. The inductance of the reactors 14 is selected to be equal to the leakage inductance of transformer 9.

Since, unlike an ideal transformer, a real transformer possesses leakage inductance, the voltage that is output on the secondary side is somewhat lowered. As a result, there is a possibility of the balance between the output voltage from the main three-phase full-wave rectifier 8 and the output voltages from the two auxiliary three-phase full-wave rectifiers 12 and 13 being lost, with the result that sufficient reduction of harmonics cannot be achieved.

Reactors 14 have the action of lowering the input voltage to main three-phase full-wave rectifier 8 by the amount that the output voltage of transformer 9 is lowered; balance of the output voltages from the main three-phase full-wave rectifier 8 and the two auxiliary three-phase full-wave rectifiers 12 and 13 is thereby maintained, making it possible to achieve even better reduction of harmonics.

Although hereinabove the example of an 18-pulse rectifier was described, this could of course be applied to a 12-pulse rectifier also.

Figure 22:
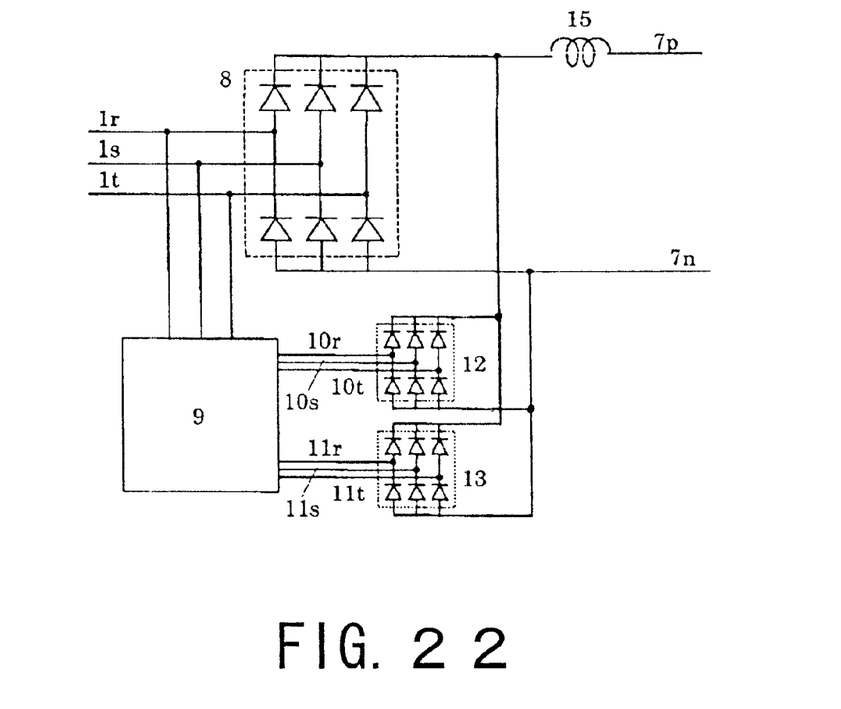
FIG. 22 is a layout diagram of an 18-pulse rectifier according to a tenth embodiment of the present invention.

FIG. 22 is a layout diagram illustrating a tenth embodiment of the present invention. In contrast to the layout of FIG. 3 which illustrates the first embodiment, DC reactors 15 are added to the DC lines 7p and 7n to which are connected in parallel the outputs of the main three-phase full-wave rectifier 8 and the two auxiliary three-phase full-wave rectifiers 12 and 13. DC reactors 15 have the action of further suppressing the harmonics that have already been reduced in some degree by passage through main three-phase full-wave rectifier 8 and transformer 9 and the two auxiliary three-phase full-wave rectifiers 12 and 13. They are therefore extremely useful in cases where even better measures against harmonics are required.

Although hereinabove the example of an 18-pulse rectifier was described, this could of course be applied to a 12-pulse rectifier also.

As described in detail above, with a rectifier according to the present invention, the current passing through the transformer and auxiliary three-phase full-wave rectifiers can be reduced to ¼ of the whole in the case of a 12-pulse rectifier and to ⅓ of the whole in the case of an 18-pulse rectifier. Transformer capacity can therefore be greatly reduced compared with conventionally, making it possible to achieve miniaturization of the pulse rectifier as whole. Also, miniaturization of the transformer can be achieved with a straightforward winding construction.

Obviously, numerous additional modifications and variations of the present invention are possible in light of the above teachings. It is therefore to be understood that within the scope of the appended claims, the present invention may be practiced otherwise than as specially described herein.

What is claimed is:

1. A rectifier, comprising:
a main three-phase full-wave rectifier that converts three-phase AC, phase, S phase, T phase into DC;
a transformer that outputs AC of a total of 3(n−1) phases corresponding to the points that equally divide by n=2, 3, the arcs drawn in a transformer vector diagram in which an equilateral triangle is formed whereof said R phase, S phase and T phase are vertices, centered on each vertex and linking the remaining two points; and
a plurality of (n−1) auxiliary three-phase full-wave rectifiers that convert into DC the 3(n−1) phase AC that is output from said transformer, wherein output lines of said main three-phase full-wave rectifier and said 3(n−1) auxiliary three-phase full-wave rectifiers are connected in parallel.

2. The rectifier according to claim 1,
wherein said transformer satisfies a transformer vector diagram obtained by adding to said equilateral triangle 3(n−1) straight lines extending parallel with one side of said equilateral triangle which is furthest, on sides of said equilateral triangle that are closest to respective points obtained by n equal divisions of said arc, in said transformer vector diagram.

3. The rectifier according to claim 2, further comprising:
a plurality of rectors corresponding to a leakage inductance of said transformer, that are mounted on each phase of power lines (R phase, S phase and T phase) between a branch point to said transformer and said main three-phase full-wave rectifier.

4. The rectifier according to claim 2, further comprising:
a harmonic attenuator that is provided on DC lines where outputs of said main three-phase full-wave rectifier and said (n−1) auxiliary three-phase full-wave rectifiers are connected in parallel.

5. The rectifier according to claim 1,
wherein, in said transformer vector diagram, said transformer satisfies a transformer vector diagram expressed by a periphery of a 3(n+2)-gon formed by superimposing a 3(n−1)-gon formed with n points of equal division of said arc as vertices on said equilateral triangle.

6. The rectifier according to claim 5, further comprising:
a plurality of rectors corresponding to a leakage inductance of said transformer, that are mounted on each phase of power lines (R phase, S phase and T phase) between a branch point to said transformer and said main three-phase full-wave rectifier.

7. The rectifier according to claim 5, further comprising:
a harmonic attenuator that is provided on DC lines where outputs of said main three-phase full-wave rectifier and said (n−1) auxiliary three-phase full-wave rectifiers are connected in parallel.

8. The rectifier according to claim 1,
wherein, in said transformer vector diagram, said transformer satisfies a transformer vector diagram expressed by a hexagon formed by straight lines parallel with a side opposite said equilateral triangle and passing through vertices of said equilateral triangle and straight lines parallel with sides adjacent said equilateral triangle passing through n points of equal division of said arc.

9. The rectifier according to claim 8, further comprising:
a plurality of rectors corresponding to a leakage inductance of said transformer, that are mounted on each phase of power lines (R phase, S phase and T phase) between a branch point to said transformer and said main three-phase full-wave rectifier.

10. The rectifier according to claim 8, further comprising:
a harmonic attenuator that is provided on DC lines where outputs of said main three-phase full-wave rectifier and said (n−1) auxiliary three-phase full-wave rectifiers are connected in parallel.

11. A transformer, comprising:
an input member that inputs three-phase AC, phase, S phase and T phase), wherein said transformer has a transformer vector diagram in which an equilateral triangle is formed, whose vertices are said R phase, S phase and T phase;
an output member that outputs AC of a total of 3(n−1) phases corresponding to a plurality of points of equal division by n,n=2, 3, of arcs centered on said each vertex and drawn connecting remaining two points.

12. The transformer according to claim 11,
wherein said transformer satisfies a transformer vector diagram obtained by adding to said equilateral triangle 3(n−1) straight lines extending parallel with said one side of said equilateral triangle which is furthest, on sides of said equilateral triangle that are closest to respective points obtained by said n equal divisions of said arc, in said transformer vector diagram.

13. The transformer according to claim 11,
wherein in said transformer vector diagram, said transformer satisfies a transformer vector diagram expressed by a periphery of said 3(n+2)-gon formed by superimposing said 3(n−1)-gon formed with n points of equal division of said arc as vertices on said equilateral triangle.

14. The transformer according to claim 11,
wherein in said transformer vector diagram, said transformer satisfies a transformer vector diagram expressed by a hexagon formed by straight lines parallel with a side opposite said equilateral triangle and passing through vertices of said equilateral triangle and straight lines parallel with sides adjacent said equilateral triangle passing through said n points of equal division of said arc.

* * * * *